(12) United States Patent
Sinha et al.

(10) Patent No.: US 10,351,781 B2
(45) Date of Patent: Jul. 16, 2019

(54) PT/PD SODALITE CAGED CATALYST COMBINATION WITH SULFIDED BASE METAL CATALYST FOR THE IMPROVED CATALYTIC HYDROPROCESSING OF FEEDSTOCK

(71) Applicant: COUNCIL OF SCIENTIFIC & INDUSTRIAL RESEARCH, New Delhi (IN)

(72) Inventors: Anil Kumar Sinha, Dehradun (IN); Mohit Anand, Dehradun (IN); Saleem Akthar Farooqui, Dehradun (IN); Rakesh Kumar, Dehradun (IN); Rakesh Kumar Joshi, Dehradun (IN); Rohit Kumar, Dehradun (IN); Tasleem Khan, Dehradun (IN); Parvez Alam, Dehradun (IN); Gopalan Sibi Malayil, Dehradun (IN)

(73) Assignee: COUNCIL OF SCIENTIFIC & INDUSTRIAL RESEARCH, New Delhi (IN)

(*) Notice: Subject to any disclaimer, the term of this patent is extended or adjusted under 35 U.S.C. 154(b) by 46 days.

(21) Appl. No.: 15/296,301

(22) Filed: Oct. 18, 2016

(65) Prior Publication Data
US 2017/0165655 A1 Jun. 15, 2017

(30) Foreign Application Priority Data
Dec. 14, 2015 (IN) .......................... 4093/DEL/2015

(51) Int. Cl.
| | |
|---|---|
| *B01J 29/04* | (2006.01) |
| *C10G 3/00* | (2006.01) |
| *B01J 37/18* | (2006.01) |
| *B01J 37/08* | (2006.01) |
| *B01J 29/74* | (2006.01) |

(Continued)

(52) U.S. Cl.
CPC .............. *C10G 3/50* (2013.01); *B01J 29/044* (2013.01); *B01J 29/045* (2013.01); *B01J 29/44* (2013.01); *B01J 29/46* (2013.01); *B01J 29/48* (2013.01); *B01J 29/74* (2013.01); *B01J 29/78* (2013.01); *B01J 29/80* (2013.01); *B01J 35/002* (2013.01); *B01J 35/0006* (2013.01); *B01J 35/026* (2013.01); *B01J 35/109* (2013.01); *B01J 35/1057* (2013.01); *B01J 35/1061* (2013.01); *B01J 37/0201* (2013.01); *B01J 37/0244* (2013.01); *B01J 37/0248* (2013.01); *B01J 37/036* (2013.01); *B01J 37/08* (2013.01); *B01J 37/18* (2013.01); *C10G 3/49* (2013.01); *B01J 2229/18* (2013.01); *B01J 2229/186* (2013.01); *B01J 2229/20* (2013.01); *B01J 2229/62* (2013.01); *C10G 2300/1014* (2013.01); *C10G 2300/1018* (2013.01); *C10G 2300/202* (2013.01); *Y02P 30/20* (2015.11)

(58) Field of Classification Search
CPC . B01J 29/74; B01J 29/78; B01J 29/044; B01J 29/045; B01J 29/80; B01J 2229/186; B01J 2229/62; B01J 35/0006; B01J 35/002; B01J 35/026; B01J 35/1061; B01J 35/1057; B01J 35/109; B01J 37/0201; C10G 3/49; C10G 3/50; C10G 2300/1014; C10G 2300/1018; C10G 2300/202; Y02P 30/20
USPC ................ 502/4, 64, 66, 67, 69, 71, 74, 77; 585/408, 469, 638, 640, 733, 240, 241, 585/357, 242; 208/60, 108, 111.35, 209
See application file for complete search history.

(56) References Cited

U.S. PATENT DOCUMENTS

| 2,163,563 A | 6/1939 | Schrauth et al. ............. 208/112 |
|---|---|---|
| 4,300,009 A | 11/1981 | Haag et al. .................. 585/408 |

(Continued)

FOREIGN PATENT DOCUMENTS

| WO | WO 2008/054442 | 5/2008 |
|---|---|---|
| WO | WO 2009/039000 | 3/2009 |

(Continued)

OTHER PUBLICATIONS

Sibi et al., "Improved Hydrogenation Function of Pt@SOD Incoporated Inside Sulfided Ni/Mo Hydrocracking Catalyst" Catal. Sci. Technol. 2016, 6, pp. 1850-1862.*

(Continued)

*Primary Examiner* — Elizabeth D Wood
(74) *Attorney, Agent, or Firm* — Norton Rose Fulbright US LLP (57) ABSTRACT

A novel pt/pd sodalite caged catalyst combination with sulfided base metal catalyst for improved catalytic hydroprocessing of renewable feedstock. Particularly, the invention relates to a process for preparation of the said catalyst. More particularly, the invention relates to a process for the preparation of hydrocarbon fuel from the feed stock using a said catalyst. Further, the invention discloses a novel catalyst and a process for the preparation of the Pt/Pd encapsulated in sodalite cage with silica-alumina ZSM-5 synthesized around it supported with nickel, molybdenum, cobalt, tungsten or one or more thereof. The invention also provides process to convert vegetable oils, free fatty acids, and microbial lipids, bio-crude and conventional non-renewable crude based feed stocks such as diesel, naphtha, kerosene, gas oil, residue, etc., into gasoline, aviation, diesel, fuel and other hydrocarbons fuel with reduced coke formation and hydrogen generation due to formation of napthenes and aromatics using the novel catalyst.

10 Claims, 4 Drawing Sheets

(51) Int. Cl.
*B01J 29/80* (2006.01)
*B01J 29/78* (2006.01)
*B01J 37/02* (2006.01)
*B01J 35/00* (2006.01)
*B01J 35/02* (2006.01)
*B01J 35/10* (2006.01)
*B01J 37/03* (2006.01)
*B01J 29/44* (2006.01)
*B01J 29/46* (2006.01)
*B01J 29/48* (2006.01)

(56) References Cited

U.S. PATENT DOCUMENTS

| | | | | |
|---|---|---|---|---|
| 4,992,605 | A | 2/1991 | Craig et al. | 585/240 |
| 5,705,722 | A | 1/1998 | Monnier et al. | 585/240 |
| 7,459,597 | B2 | 12/2008 | Koivusalmi et al. | 585/733 |
| 7,491,858 | B2 | 2/2009 | Murzin et al. | 585/240 |
| 2004/0230085 | A1 | 11/2004 | Jakkula et al. | 585/240 |
| 2017/0022126 | A1* | 1/2017 | Mukherjee | C07C 2/58 |

FOREIGN PATENT DOCUMENTS

| | | |
|---|---|---|
| WO | WO 2009/039335 | 3/2009 |
| WO | WO 2009/039347 | 3/2009 |

OTHER PUBLICATIONS

Sibi et al., "Improved Hydrogenation Function of Pt@SOD Incoporated Inside Sulfided Ni/Mo Hydrocracking Catalyst", Catal. Sci. Technol. 2016, pp. 1850-1862.*

* cited by examiner

PT/PD SODALITE CAGED CATALYST COMBINATION WITH SULFIDED BASE METAL CATALYST FOR THE IMPROVED CATALYTIC HYDROPROCESSING OF FEEDSTOCK

FIELD OF THE INVENTION

The present invention relates to a novel multifunctional Pt/Pd sodalite caged catalyst combination with sulfided base metal catalyst for the improved catalytic hydroprocessing of feedstock. Particularly, the present invention relates to a process for preparation of the said catalyst. More particularly, the present invention relates to a process for the preparation of hydrocarbon fuel from the feed stock using a said catalyst.

BACKGROUND OF THE INVENTION

U.S. Pat. No. 2,163,563 discloses the hydrogenation of vegetable oils combined with mineral oil over a reduced Ni catalyst supported in alumina in the presence of hydrogen at high pressure [5 MPa to 50.6 MPa (50 to 500 atmospheres)]. However, this patent does not involve hydrotreatment of a combined load of petroleum and vegetable oils through an HDT process. U.S. Pat. No. 4,300,009 describes a process for generating the product having the boiling point at the range of gasoline boiling point range. This process involves catalytic conversion of anabolites (substances formed in the anabolic process) as resins, vegetable oils and fats in liquid hydrocarbons over zeolites with an effective pore size bigger than 5 Angstrom. U.S. Pat. No. 5,705,722 describes a process to produce additives for diesel fuel which have higher cetane number and may improve ignition of the fuel. The process involves hydroprocessing of the biomass, containing a high proportion of unsaturated fatty acids, wood oils, animal fats and other mixtures in the presence of hydrogen over catalyst. This mixture is then separated and fractioned to obtain a hydrocarbon product with boiling point at the range of diesel's boiling point, being this product the additive with a high cetane number. However the addition of a petroleum hydrocarbon to the biomass load which is being hydroprocessed is not mentioned within this document.

U.S. Pat. No. 4,992,605 describes a process to obtain a stream with a high cetane number to be added to the diesel in the refinery. The process involves hydroprocessing of vegetable oils such as canola or sunflower oil, palm and wood oil that is a waste product from the wood pulp industry, to produce hydrocarbon products in the diesel boiling range by using sulfided catalyst (NiMo and CoMo) in the presence of hydrogen (pressure of 4 to 15 MPa) and temperature in the range of 350° C. to 450° C. This patent does not consider a mixture of a hydrocarbon with vegetable oil in the hydrorefining.

U.S. Pat. Nos. 7,491,858, 7,459,597 B2, describe production of diesel fuel from vegetable and animal oils and also the further isomerization of obtained hydrocarbons using catalysts known in the prior art. Patent WO 2008054442 describes a process for converting triglycerides to hydrocarbons. U.S. Pat. No. 4,300,009 describe the production of hydrocarbons such as gasoline and chemicals such as para-xylene from plant oils such as corn oil by using of crystalline aluminosilicate zeolites. US 2004/0230085 A1 discloses a process for treating a hydrocarbon component of biological origin by hydrodeoxygenation followed by isomerization.

WO 2009/039000, WO 2009/039335, WO/2009/039347 describe a process which comprises one or more steps to hydrogenate, decarboxylate, decarbonylate, (and/or hydrodeoxygenate) and isomerize the renewable feedstock, the consumption of hydrogen in the deoxygenation reaction zone is reduced by using at least one sulfur containing component which also operates to maintain the catalyst in a sulfided state.

Patent 0176NF2012, describes a single step catalyst and process for hydroconversion of vegetable oils triglycerides and free fatty acids to directly to iso-paraffins, paraffins, cyclic and aromatics in the kerosene range to produce aviation fuel.

The conversion of renewable feed stocks into aviation fuel and other hydrocarbons is energy intensive. These are highly exothermic reactions with very high hydrogen consumption, which is major concern for commercial realization of these processes. These highly exothermic reactions, not only decreases the catalyst life but also leads to unwanted cracking and coke formation reactions in catalyst pores; further leading to high pressure drop, low catalyst life and costly process. The hydrogen requirement is increased as the unsaturated hydrocarbons formed due to unwanted cracking reactions gets saturated and hence require extra hydrogen which further adds up the cost.

Sodalite and LTA zeolites have been synthesized for these applications using in-situ method in which ligand stabilized metal precursors was added during synthesis of the host material.[18-24] Cavity inside the cages accommodated the metal nanoparticles or clusters which protected the metals against sintering or poisoning during thermal treatment or catalysis. The successful encapsulation of Pt clusters within LTA[24-27] and MFI[28], Ru clusters within LTA[29], Rh clusters within LTA and Au clusters within MFI[30-32] have been reported via hydrothermal syntheses. These materials have been used to explore the consequence of encapsulation for cluster stability, reactivity and selectivity [Reff]. S. Goel et al.[23] incorporated various transition metals inside different zeolite cages (SOD, GIS, ANA), which showed high stability against sintering and gave prolongedselective hydrogenation activity. The ligand stabilized metal complexes were completely incorporated inside the cages and this assumption was also observed and confirmed by M. Choi et al. with improved hydrogen spillover effects.[24]

To realize a commercial future of renewable feed stocks and non-renewable crude based feed stocks, it is very necessary to develop technologies which would deliver hydrocarbon fuels including aviation fuel at competitive prices with reduced hydrogen consumption and increased performances of the catalyst. A catalytic process where hydrogen requirement for conversion of reactants would be less along with controlled reactions with reduced exothermicities, increased catalyst life with reduced coke deposition is highly desirable. A process and catalyst where these renewable feedstocks and conventional non-renewable crude based feed stocks such as diesel, naphtha, kerosene, gas oil, residue, etc., are converted selectively to paraffins, isoparaffins, cyclics and aromatics in C1-C24 range hydrocarbons directly with reduced hydrogen consumption, with reduced coke formation and hydrogen generation due to formation of napthenes and aromatics is very much need and desired.

Increased demand for cleaner fuel due to environmental concern and depleting petroleum reserves in the world coupled with deteriorating quality of the crude oil have led a surge of research for renewable and clean fuel sources. One of the renewable sources may be the oil originating from vegetables and animals such as waste restaurant oil, soybean oil, Jatropha oil, and algae oil etc. This also helps in rural development by providing better cost for their products. But these oils originating from vegetables and animals cannot be used directly in the engine due to the problems inherent with these oils such as higher viscosity and oxygen content and poor atomization and lubricity. Therefore before using in the engine these oils are to be converted into bio-diesel or green diesel. Bio-diesel which is Fatty Acid Methyl Esters (FAME) is produced by transesterification of fatty acids in triglycerides. To use bio-diesel in the engine requires some modification and additional disadvantages are poor performance in cold weather and poor emission. Another way of effectively using these renewable oils is by converting these oils into hydrocarbons with much higher cetane value than conventional diesel fuel. This process involves conversion of fatty acids in triglycerides into linear and/or iso-alkanes. This may be obtained by hydrodeoxygenation, decarbonylation, decarboxylation, isomerisation and hydrocracking or a combination of two or more thereof.

The conversion of renewable feed stocks such as plant, animal and algal oils triglycerides and free fatty acids and conventional non-renewable crude based feed stocks such as diesel, naphtha, kerosene, gas oil, residue, etc., into gasoline, aviation, diesel, fuel and other hydrocarbons is energy intensive and require large amount of hydrogen. High hydrogen requirement, highly exothermic reactions involved in the process, quench hydrogen requirement, high deactivation rate of the catalyst are major concerns for commercialization of the processes. The hydrogen requirement is increased as the unsaturated hydrocarbons formed due to unwanted cracking reactions gets saturated and hence require extra hydrogen which further add up the cost. A process and catalyst where these feedstocks are converted selectively to paraffins, isoparaffins, cyclics and aromatics in C1-C24 range hydrocarbons directly with reduced hydrogen consumption is very much needed and desired.

Metal sulfide catalysts with acidic supports have been widely used for vegetable oil as well as crude based feed stocks hydroprocessing. Zeolite based catalytic material deactivates quickly at higher reaction temperature and pressure. The deactivation was mainly due to coke deposition and low hydrogenation ability. Coke deposits of around 15% or even 20% (w/w) of the catalyst may deactivate the catalyst either by covering of the active sites, and by pore blocking. It has been reported that coke formation occurs more rapidly when a hydrogen acceptor, such as olefins, is present, in line with the hypothesis of a carbonium ion chemistry of coke formation. Rapid catalyst deactivation observed during hydroprocessing of renewable oils or crude based products due to coke and water formation limits the economic viability of such processes for future fuels. These problems could be resolved by introducing strongly hydrogenating noble metals in traditional hydroprocessing catalysts.

The present invention relates to preparation of a novel catalyst (synthesis of multifunctional Pt/Pd encapsulated in sodalite cage with ZSM-5 synthesised around it supported with nickel, molybdenum, cobalt, tungsten or one or more thereof and Pt/Pd encapsulated in sodalite cage impregnated along with nickel, molybdenum, cobalt, tungsten or one or more thereof over $SiO_2$—$Al_2O_3$, zeolite, $Al_2O_3$ supports to convert vegetable oils, free fatty acids, and microbial lipids, bio-crude and conventional non-renewable crude based feed stocks such as diesel, naphtha, kerosene, gas oil, residue, etc., into gasoline, aviation, diesel, fuel and other hydrocarbons fuel with reduced coke formation and hydrogen generation due to formation of napthenes and aromatics. Particularly the invention falls within the processing field of hydroconversion of renewable feed stocks and non-renewable crude based feed stocks specifically, for the formation hydrocarbon fuel, C1-C24, including aromatics and napthenes with reduced coke formation due to increased hydrogenation functionality using a novel catalytic process.

Considering the limitations and inaccessibility of the complex feedstock (due to greater kinetic diameter) such as renewable oil, vacuum residue, gas oil molecules to the active metal clusters, a multi-functional core-shell catalyst have been synthesized for hydroprocessing to produce hydrocarbons. These core shell catalyst have platinum/palladium metal incorporated sodalite (Pt/Pd@SOD) as core and mesoporous zeolite (ZSM-5) or mesoporous $SiO_2$—$Al_2O_3$/$Al_2O_3$ as shell and base metals supported on it. The hydrogenation activity of the impregnated base metal oxides have been achieved through sulfidation with dimethyl disulfide. The overall hydrogenation activity has improved through the spillover of the hydrogen from Pt/Pd. Due to the high percentage of d character; platinum can dissociate the hydrogen molecules faster than nickel and molybdenum. This hydrogen atom can have easily transferred from noble metal to nickel/molybdenum/cobalt/tungsten and to the reactant molecules. Even though the Pt/Pd metal inside the core shell was very prone to sulfur poisoning, the presence of sodalite cages protects the metal clusters from the sulfiding agents. The incorporation of the zeolitic/silica-alumina/alumina shell in the catalyst would provide the required acidity/for hydrogenation, cracking and isomerization reactions during hydroprocessing reactions.

The main drawbacks of the above patented literature is high hydrogen requirement, highly exothermic reactions involved in the process, quench hydrogen requirement, high deactivation rate of the catalyst are major concerns for commercialization of the processes and the hydrogen requirement is increased as the unsaturated hydrocarbons formed due to unwanted cracking reactions gets saturated and hence require extra hydrogen which further add up the cost.

The patented literature presents some documents in the hydrogenation of vegetable oil, but these documents do not consider in their scope the intended range covered by this invention.

OBJECTS OF THE INVENTION

The main object of the present invention is to provide a novel Pt/Pd sodalite caged catalyst combination with sulfided base metal catalyst for the improved catalytic hydroprocessing of feedstock. These core shell catalyst having platinum/palladium metal incorporated sodalite (Pt/Pd@SOD) as core and mesoporous zeolite (ZSM-5) or mesoporous $SiO_2$—$Al_2O_3$/$Al_2O_3$ as shell and base metals such as nickel, molybdenum, cobalt, tungsten supported on it for the hydroprocessing of renewable feed stocks such as vegetable oils, free fatty acids, and microbial lipids, bio-crude and nonrenewable crude based feed stocks specifically, for the formation hydrocarbon fuel, C1-C24, including aromatics and napthenes with reduced coke formation due to increased hydrogenation functionality using a novel catalytic process into hydrocarbon fuel in low $H_2$ environment.

Another object of the present invention is to provide a process for preparation of the said catalyst.

Another object of the present invention is to provide a process for the preparation of hydrocarbon fuel from the feed stock using a said catalyst.

SUMMARY OF THE INVENTION

The invention describes an innovative methodology for the synthesis of multifunctional catalyst consisting of Pt/Pd encapsulated in sodalite cage with ZSM-5 synthesised around it supported with nickel, molybdenum, cobalt, tungsten or one or more thereof and Pt/Pd encapsulated in sodalite cage impregnated along with nickel, molybdenum, cobalt, tungsten or one or more thereof over $SiO_2$—$Al_2O_3$, zeolite, $Al_2O_3$ supports to convert vegetable oils, free fatty acids, and microbial lipids, bio-crude and conventional non-renewable crude based feed stocks such as diesel, naphtha, kerosene, gas oil, residue, etc., into gasoline, aviation, diesel, fuel and other hydrocarbons fuel with reduced coke formation and hydrogen generation due to formation of napthenes and aromatics.

The synthesized catalyst showed high hydrogenation activity at lower hydrogen/feed ratio (200-1500) even at lower pressure (50-60 bar). Nearly complete conversions (≥99%) were obtained at various reaction conditions, while the formation of undesired coke precursors was suppressed. The catalyst gave better stability against deactivation and poisoning during continuous run. High hydrogenation activity at lower hydrogen partial pressures, at reduced $H_2$/feed ratio's and reduced total reactor pressures, due to the spillover of hydrogen from the platinum/palladium clusters inside the sodalite cages to sulfided base metals. Zeolitic/Silica-alumina/alumina shell gave the required acidity to the material and improved the cracking and isomerization reaction even at low $H_2$/feed ratios. The extra larger mesopores interconnected with micropores gave crystalline nature and easy diffusion of the bulky reactant and isomeric products.

Accordingly, the present invention relates to a multifunctional catalyst comprising of platinum or palladium or both incorporated in sodalite cage and mesoporous zeolte or mesoporous $SiO_2$—$Al_2O_3$/$Al_2O_3$ as shell and the shell is impregnated with base metals.

In an embodiment of the present invention, mesoporous zeolite is ZSM-5.

In another embodiment of the present invention, the base metal as is selected from the group consisting of nickel, molybdenum, cobalt, tungsten or mixture thereof.

In still another embodiment of the present invention, a process for preparation of the multifunctional catalyst comprising the steps of:
 a) preparing a solution of $NaAlO_2$ and NaOH in demineralized water;
 b) mixing solution of step with fumed $SiO_2$ to obtain a gel;
 c) preparing a solution of $[Pt(NH_3)_4]NO_3$ in water;
 d) charging drop wise the solution obtained step c) to the gel obtained in step b) to obtain a gel mixture;
 e) transferring the gel mixture of step d) to a sealed contained and homogenized by vigorous stirring to obtain a gel;
 f) the gel obtained in step e) is stirred at oil batch at 353-393K;
 g) filtering and washing with water until filtrate is neutral to obtain catalyst;
 h) reducing the catalyst at 573-873K in hydrogen atmosphere to obtain Pt/Pd sodalite cage;
 i) preparing a solution of $NaAlO_2$ in distilled water to obtain a solution;
 j) mixing the solution obtained in step i) with TBAOH and stirring for 2-4 hours;
 k) keeping the solution static for 24 hours to obtain a solution;
 l) preparing a solution of ODAC in water absolute ethanol mixture to get a clear solution;
 m) preparing a solution of catalyst obtained in step h) in water:ethanol mixture and sonicating to obtain a clear solution;
 n) mixing the solutions of step l) and solution of step m) to the solution of step k);
 o) stirring the entire solution at a temperature of 303-363K for 24-30 hours and autoclaving the mixture at 400-453K for 36 hours;
 p) filtering and washing to get the catalyst and calcined at 623-923K to get the new material;
 q) ion exchanging the material synthesized in step p) with ammonia solution for at 60-90° C. to obtained ion exchanged material;
 r) using known wet impregnation method to impregnate the base metals on the ion exchanged material of step q) to obtain the catalyst.

In a preferred embodiment of the present invention, the base metal is selected from the group consisting of nickel, molybdenum, cobalt, tungsten or mixture thereof.

In yet another embodiment of the present invention, a process for the preparation of hydrocarbon fuel from the feed stock using a catalyst comprising the steps of:
 a) suspending the sulfide catalyst of claim 1 in a fixed bed reactor;
 b) maintaining the reactor at 300-480° C. and 50-150 bar pressure;
 c) charging the feed stock and $H_2$ gas;
 e) simultaneous distillation of product to obtain different fractions.

In still yet another embodiment of the present invention, the catalyst is supported with sulfided base metals like nickel, molybdenum, cobalt and tungsten or a mixture of one or more along with a noble metal like palladium, platinum protected inside sodalite cage.

In another embodiment of the present invention, the noble metal is encapsulated inside sodalite cage for preventing poisoning of noble metal from poisons such as sulfur containing species.

In a preferred embodiment of the present invention, coke precursors are reduced due to increased hydrogenation ability of the sulfided catalyst in the presence of noble metals.

In another embodiment of the present invention, the catalyst life is increased for the sulfided catalyst in the presence of noble metals.

In still another embodiment of the present invention, the feedstock is selected from vegetable oil, free fatty acids, microbial lipids, bio crude, and nonrenewable crude.

DETAILED DESCRIPTION OF THE INVENTION

Figure 1:
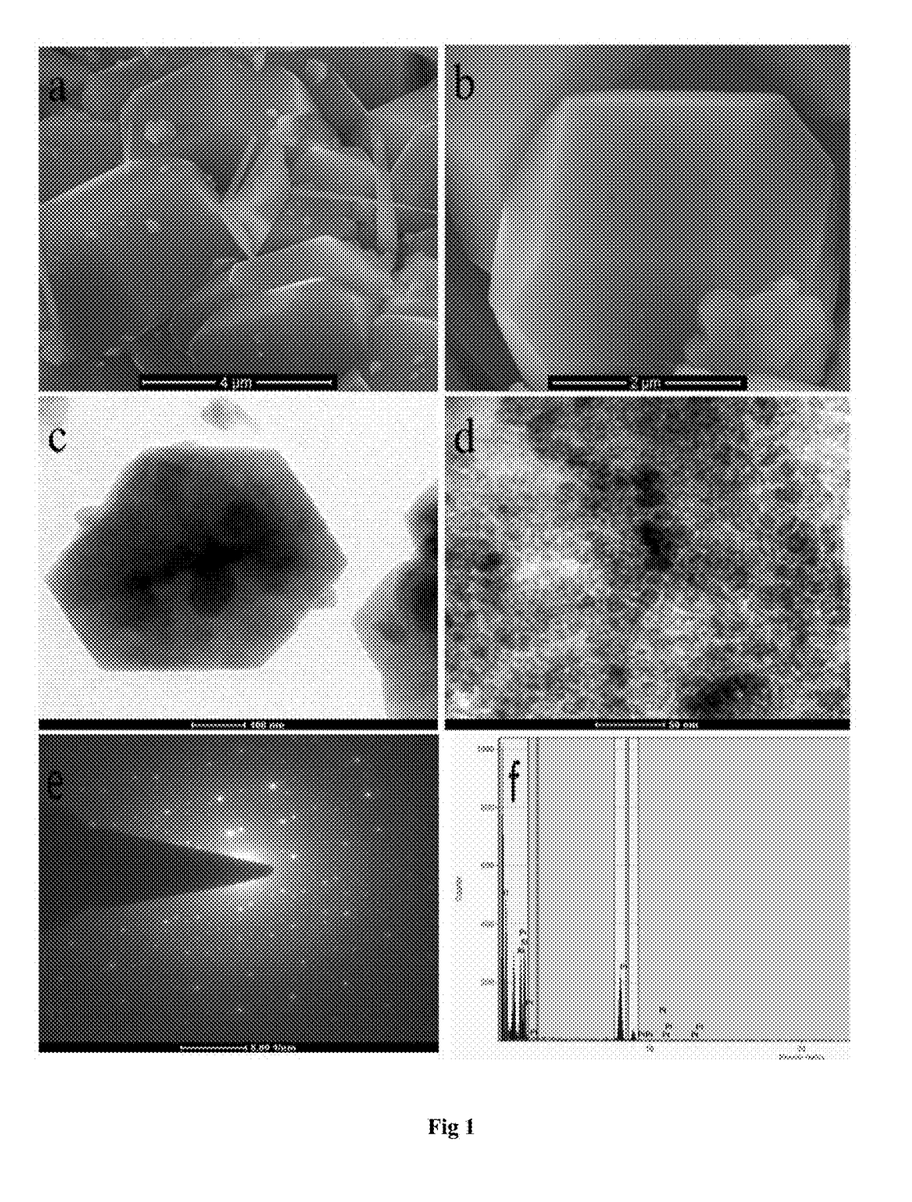
FIG. 1: HRTEM images of (a) Pt@SOD (FESEM, HRTEM, SAED and EDAX images of (a, c, e, f) bulk Pt@SOD crystals (b, d) Exposed Pt@SOD single crystal)
Figure 2:
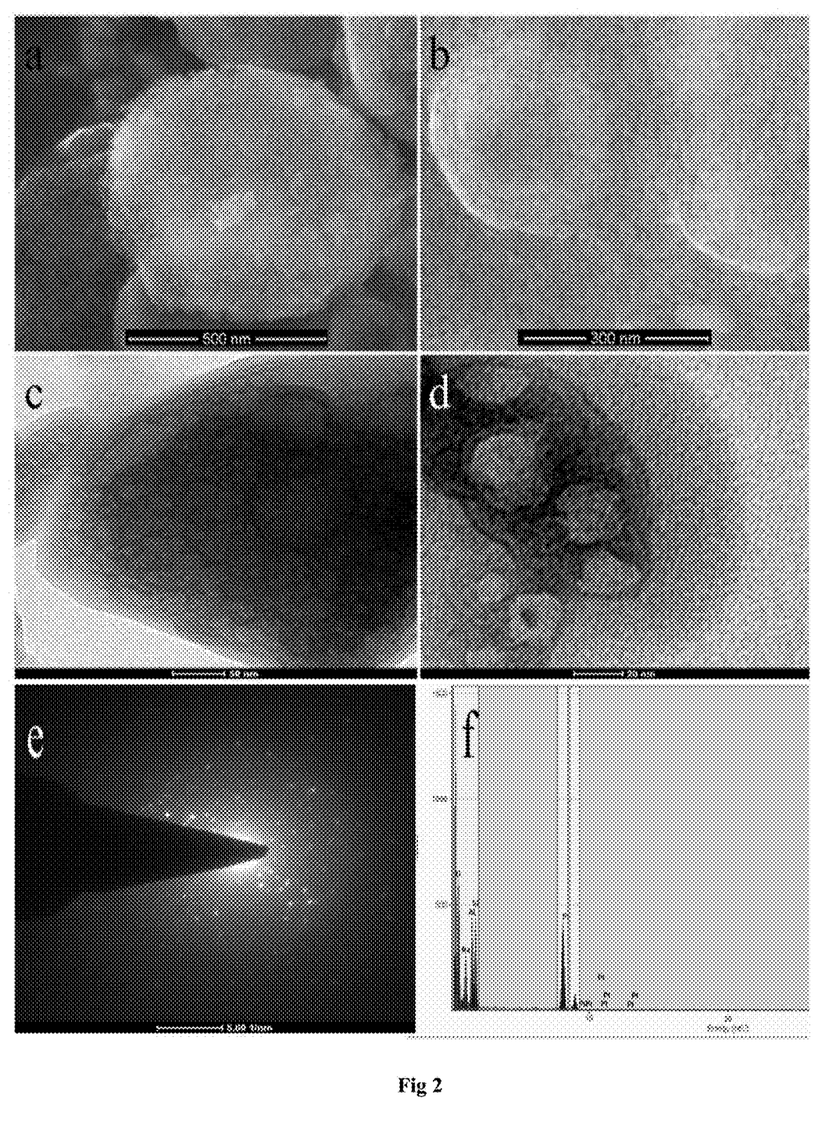
FIG. 2: HRTEM images of Pt@SOD@ZSM-5 (FESEM (a, b), HRTEM (c,d), SAED (e) and EDAX (f) images of Pt@SOD@ZSM-5 (b & d are the bright field image of enlarged portions)
Figure 3:
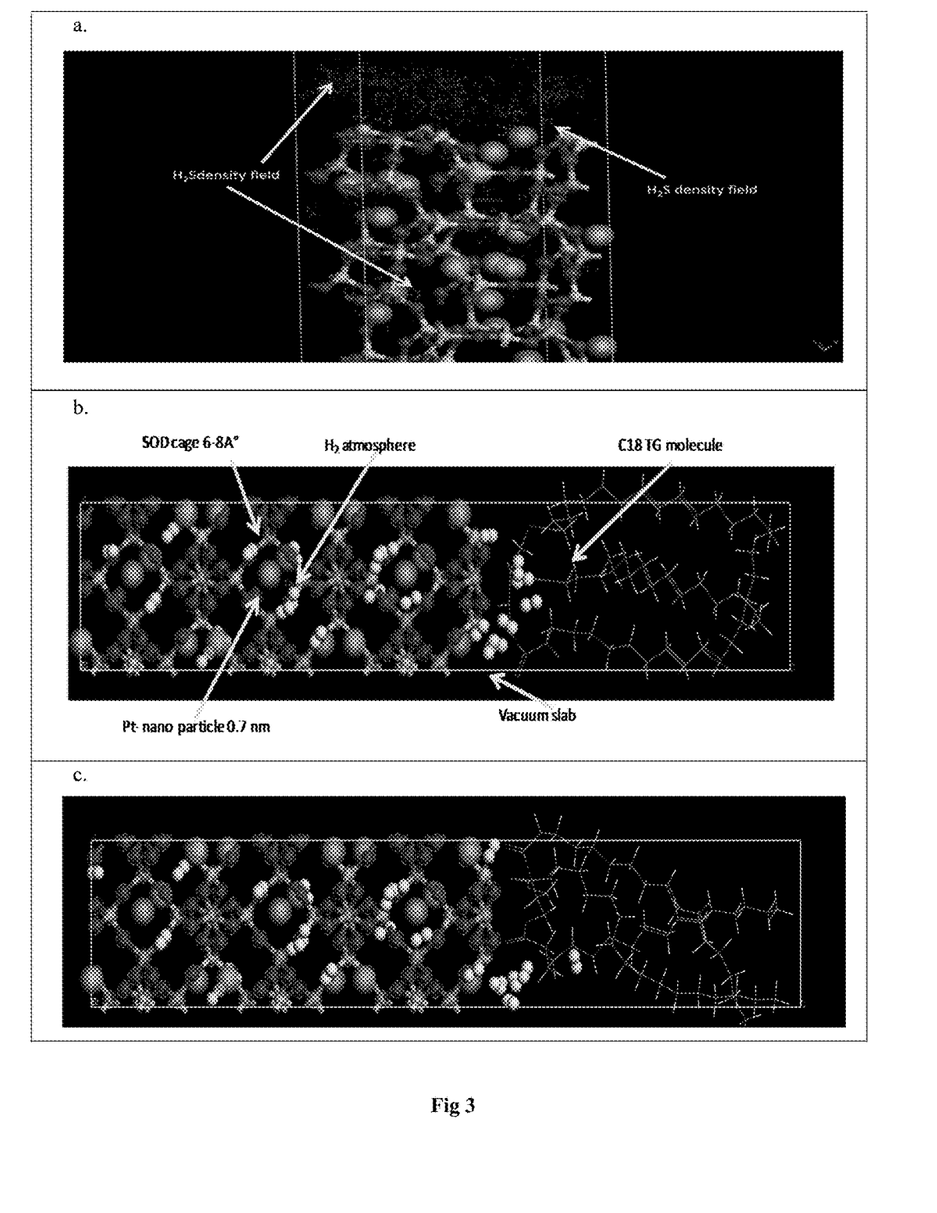
FIG. 3: a. Representative $H_2$ and $H_2S$ density field across SOD structure (Green=$H_2S$ field density, Red $H_2$ field density) and C-18 Triglyceride stabilized on SOD structure populated with $H_2$ with Pt inside SOD cage (b) and Without Pt
Figure 4:
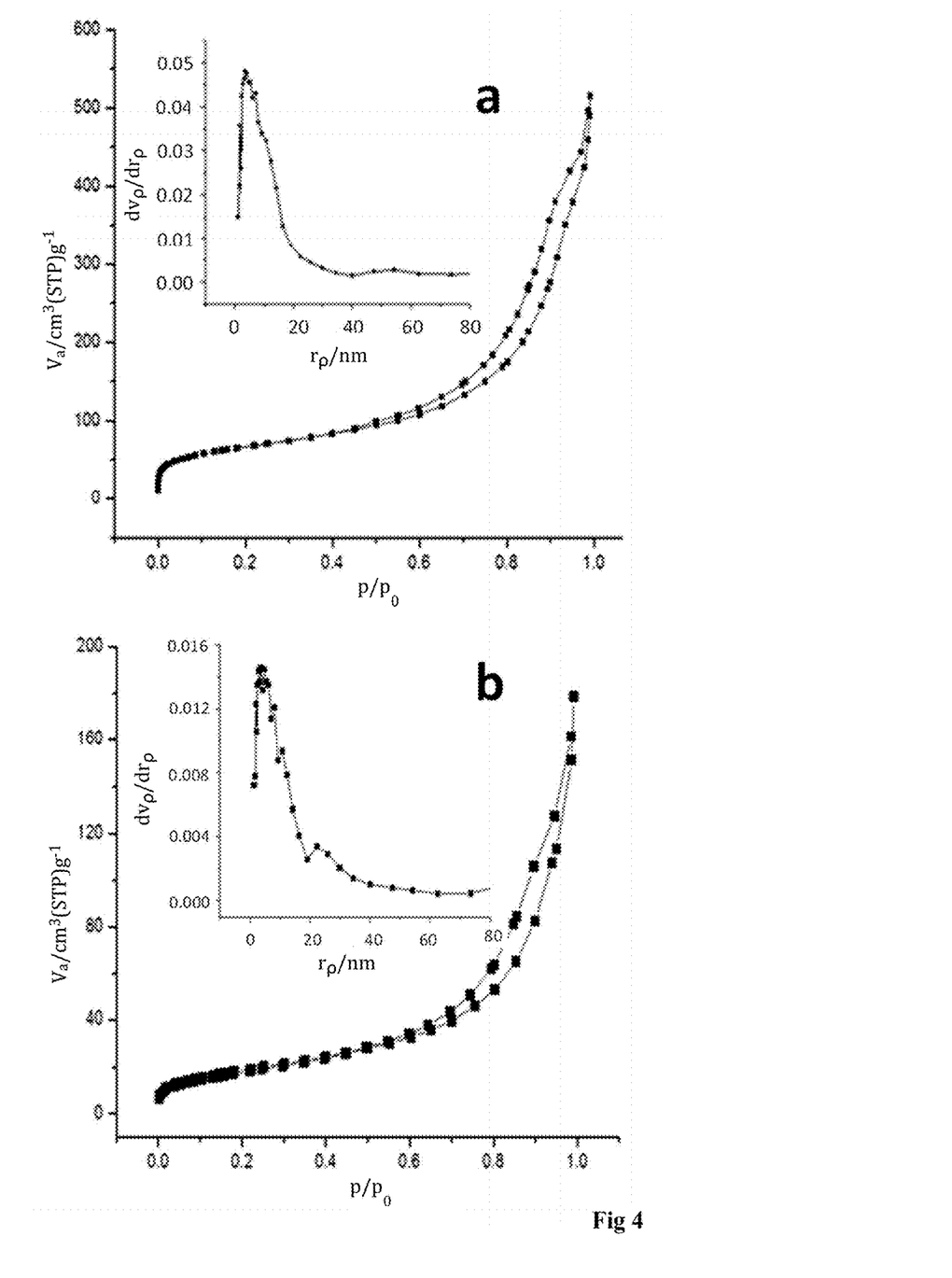
FIG. 4: $N_2$ Sorption and BJH analysis of (a) Pt@SOD@ZSM-5 (b) Ni/Mo/Pt@SOD@ZSM-5

In this work demonstration of multifunctional catalyst having platinum@Sodalite as a core and ZSM-5/silica-alumina/alumina as a shell used as support for hydroprocessing of vegetable oils and conventional non-renewable crude based feed stocks such as dieselnaphtha, kerosene, gas oil, residue, etc., into gasoline, aviation, diesel, fuel and other hydrocarbons fuel with reduced coke formation and hydrogen generation due to formation of napthenes and aromatics has been carried out.

Generally, Noble metals are highly active and selective in complex reaction systems like hydrotreating, aromatization etc and most of these are used in supported form. Supported catalysts generally encounter the difficulties of dispersion control and low stability against sintering, agglomeration and lose the activity quickly. Not only this, the harsh conditions applied in the hydrotreating process with refractory sulfur compounds poisoned the catalyst rapidly. Interest in zeolite for their use in various applications such as catalysts, host-guest materials, thin films, hydrogen storage, etc. is being researched. The major challenges in practically utilizing the immense potential benefits of these nanomaterials are controlling aggregation, recycling the materials, and fabricating well-defined nanoparticulate materials.

Sodalite (SOD) a small pore zeolite, whose framework consists of six membered ring apertures with a window size of 3.652 Å and 5.168 Å and 6-8 Å cage diameter, could encapsulate a metal nanoparticle or metal clusters of platinum (Pt) inside their cages. These cages could protect the clusters from sintering and also prevent their poisoning due to toxic impurities such as $H_2S$ and sulphur containing compound. The present invention relates to the synthesis of these materials to explore the consequence of encapsulation for cluster stability, reactivity, selectivity and also effect on long term stability of the catalyst, for the Hydroprocessing reactions.

The present invention also relates to improved hydrogenation function incorporated in the hydroprocessing catalyst. The synthesis of multifunctional catalyst consisting of Pt/Pd encapsulated in sodalite cage with ZSM-5 synthesised around it supported with nickel, molybdenum, cobalt, tungsten or one or more there off and Pt/Pd encapsulated in sodalite cage impregnated along with nickel, molybdenum, cobalt, tungsten or one or more thereof over $SiO_2$—$Al_2O_3$, zeolite, $Al_2O_3$ supports to convert vegetable oils, free fatty acids, and microbial lipids, bio-crude and conventional non-renewable crude based feed stocks such as diesel naphtha, kerosene, gas oil, residue etc into gasoline, aviation, diesel, fuel and other hydrocarbons fuel with reduced coke formation and hydrogen generation due to formation of napthenes and aromatics. Particularly the invention falls within the processing field of hydroconversion of renewable feed stocks and nonrenewable crude based feed stocks specifically, for the formation hydrocarbon fuel, C1-C24, including aromatics and napthenes with reduced coke formation due to increased hydrogenation functionality using a novel catalytic process.

In this application, synthesis of such a multifunctional catalyst having platinum@SOD as a core and ZSM-5/$SiO_2$-$Al_2O_3$/$Al_2O_3$ shell as a support along with the reaction process for hydroprocessing of vegetable oils, free fatty acids, and microbial lipids, bio-crude and conventional non-renewable crude based feed stocks such as diesel, naphtha, kerosene, gas oil, residue etc into gasoline, aviation, diesel, fuel and other hydrocarbons fuel with reduced coke formation and hydrogen generation due to formation of napthenes and aromatics at reduced hydrogen to feed ratio's with increased catalytic performances.

The present invention relates to a low hydrogen catalytic process for the manufacture of the n-paraffins, iso-paraffins, cyclic and aromatics for gasoline and/or aviation turbine fuel and/or diesel range hydrocarbons (C1-C24 range) from renewable source such as oils originating from plant algae and animal fats and from conventional non-renewable crude based feed stocks such as diesel, naphtha, kerosene, gas oil, residue etc into gasoline, aviation, diesel, fuel and other hydrocarbons fuel with reduced coke formation and hydrogen generation due to formation of napthenes and aromatics. The feedstocks are converted into hydrocarbons by similar pathways such as decarboxylation/decarbonylation, hydrodeoxygenation, hydrodesulphurization along with cracking, isomerisation, cyclization and aromaticization reactions. Better product selectivity is obtained by suitably selecting the catalyst and process conditions with controlled exothermicities and with favorable changes in the product pattern thereby very low hydrogen gas requirement.

Considering the limitations and inaccessibility of the complex feedstock (due to greater kinetic diameter) such as renewable oil molecules and crude based residue/gas oil molecules to the active metal clusters, a multi-functional core-shell catalyst consisting of Pt/Pd encapsulated in sodalite cage with ZSM-5 synthesized around it supported with nickel, molybdenum, cobalt, tungsten or one or more there off and/or Pt/Pd encapsulated in sodalite cage impregnated along with nickel, molybdenum, cobalt, tungsten or one or more there off over $SiO_2$—$Al_2O_3$, zeolite, $Al_2O_3$ supports to convert have been synthesized for hydroprocessing to produce hydrocarbons. The hydrogenation activity of the impregnated base metals such as Ni & Mo oxide metal have been achieved through sulfidation with dimethyl disulfide. The overall hydrogenation activity has improved through the spillover of the hydrogen from Pt/Pd. Due to the high percentage of d character; platinum can dissociate the hydrogen molecules faster than nickel and molybdenum. This hydrogen atom can have easily transferred from noble metal to nickel/molybdenum/cobalt/tungsten and to the reactant molecules. Even though the Pt/Pd metal inside the core shell was very prone to sulfur poisoning, the presence of sodalite cages protects the metal clusters from the sulfiding agents. The incorporation of the zeolitic/silica-alumina/alumina shell in the catalyst would provide the required acidity/for hydrogenation, cracking and isomerization reactions during hydroprocessing reactions.

The liquid feedstock is contacted with a catalyst in the presence of hydrogen at temperature, $H_2$/feed ratio and pressure and liquid hourly velocity of 320-500° C., 100-3000 Nl/L, 30-150 atm and 0.5-6.0 $h^{-1}$ respectively more preferably temperature and pressure and liquid hourly velocity of 360-460° C., 200-2500 Nl/L, 60-120 atm and 0.5-3.0 $h^{-1}$ respectively. The product patterns thus obtained are very much similar to those obtained over the conventional catalytic process and similar conversion levels could be achieved (Table-1) even at low $H_2$/HC ratio. There is also increase in yield of jet range hydrocarbons along with cyclic and aromatics because of reduction in additional side reactions earlier taking place at increased temperatures, along with production of hydrogen due to formation of aromatics and cyclics. The catalytic supports used for this process are mesoporous alumina, mesoporous silica-alumina, ZSM-5 as core-shell catalyst having platinum/palladium metal incorporated sodalite (Pt/Pd@SOD) as core and mesoporous zeolite (ZSM-5) or mesoporous $SiO_2$—$Al_2O_3$/$Al_2O_3$ as shell and base metals supported on it or a combination of two or more thereof. Non precious metals including nickel, cobalt, molybdenum and tungsten or a combination of two or more thereof e.g., nickel-molybdenum (NiMo), cobalt-molybdenum (CoMo) nickel-tungsten (Ni—W) can be used as active base metals impregnated on the catalytic supports for this process. In the present invention Ni&Mo impregnated over $Al_2O_3$/$SiO_2$-$Al_2O_3$/ZSM-5 shell with Pt nano clusters incorporated inside Sodalite cages as a core; is synthesized and used for demonstration. Only small amount of Pt has been used to increase the hydrogenation activity. These catalyst materials have 3-dimensional mesoporosity for efficient diffusion of reactants and selective diffusion of products with minimum pore blockage by coking. Pt incorporated inside sodalite cage window makes necessary hydrogen available by spill over to prevent any additional unwanted side reactions. minimizing the secondary unwanted reactions reduces the total hydrogen consumption of the process. This dramatically improves the life of the catalyst, and also makes the regenerability of the catalyst more convenient. Preferably, high surface area Pt@SOD@ZSM-5/Pt@SOD@$SiO_2$/$Al_2O_3$ is used as support due to high dispersion of nanoparticles of active metals in the mesopores and on the surface with selective diffusion of bulky reactants, selective diffusion of products and $H_2$ spillover effects of Pt for enhanced hydrogenation with minimal poisoning due to sulfur compounds. This also prevents any additional side reactions for further transformations of primary reactions products such as further reduction of aromatic and cyclic hydrocarbon compounds formed into saturates and open ring compounds. Minimizing the secondary unwanted reactions reduces the total hydrogen consumption of the process as well. Catalyst is sulfided/reduced in the reactor itself using the conventional methodology followed for hydrocracking catalysts (Patents 0176NF2012).

In one embodiment of this invention synthesis of core shell catalyst having platinum/palladium metal incorporated sodalite (Pt/Pd@SOD) as core and mesoporous zeolite (ZSM-5) or mesoporous $SiO_2$—$Al_2O_3$/$Al_2O_3$ as shell and base metals supported on it is synthesized and demonstrated with active metal such as Ni and Mo impregnation for hydroprocessing of vegetable oils.

In an alternate embodiment of this invention, renewable vegetable oils such as pure triglycerides preferably jatropha oil containing free fatty acids, or algal oil, waste cooking and conventional non-renewable crude based feed stocks such as diesel, naphtha, kerosene, gas oil, residue, etc., is contacted with disclosed catalyst in the presence of hydrogen at temperature and pressure for conversion into gasoline, aviation, diesel fuel and other hydrocarbons fuel with reduced coke formation and hydrogen generation due to formation of napthenes and aromatics. The temperature range of the catalytic bed may vary from 320° C. to 500° C., preferably between 360° C. to 460° C. The pressure range of the catalytic bed may vary from 30 to 150 bar, preferably in the range of 60 to 120 bar. The space velocity range may be from 0.5 $h^{-1}$ to 6 $h^{-1}$, preferably between 0.5 h−1 and 3 h−1. The hydrogen/hydrocarbon ratio in the reactor may vary from 100 NL of hydrogen/L of hydrocarbon to 3000 NL of hydrogen/L of hydrocarbon preferably between 200 NL of hydrogen/L of hydrocarbon to 2500 NL of hydrogen/L of hydrocarbon. The products were analyzed by gas-chromatography ASTM D6730 DHAX analysis.

The following examples are given by way of illustrations and should not construed the scope of the invention.

EXAMPLES

Below, the present invention is further described in detail by working Examples, to which the present invention is not limited. The products were analyzed by gas-chromatography, ASTM D6730 DHAX analysis. Simulated distillation of the products was carried out according to the ASTM-2887-D86 procedure. Total acidity number (TAN) was determined following ASTMD974 method.

Example 1

Synthesis of Pt@SOD Having 0.25-0.75% Platinum

Gels with molar composition of 20 $Na_2O$: 1.0 $Al_2O_3$: 1.5 $SiO_2$: 160.$H_2O$. 1.63 g $NaAlO_2$ and 15.2 g of NaOH were dissolved in demineralized $H_2O$ (28.8 g) and mixed with 0.9 g of fumed $SiO_2$. Metal precursor, Pt($NH_3$)$_4$] ($NO_3$)$_2$, (9 mg) were dissolved in 10 $cm^3$ $H_2O$ and added drop wise to the gel. The gel was transferred into a 125 $cm^3$ polypropylene container, sealed, and homogenized by vigorous magnetic stirring for 600 s. These gels were stirred in an oil bath at 400 rpm and 373 K for 7 hrs. Filtered and washed with water till the filtrate to be neutral dried and calcined at 623 K for 3 hrs. The catalyst is reduced at 623 K for 3 hrs with 10% hydrogen. Material with various platinum 0.25%, 0.50% and 0.75% was prepared with varying platinum precursor concentration.

Synthesis of Pt@SOD@ZSM 0.1578 g $NaAlO_2$ was dissolved in 8.24 g distilled water and the solution is mixed with 10.96 g of TBAOH (Tetrabutyl ammonium hydroxide) followed by 6.2 ml and stirred for 2 hours (soln I). The solution remains static for 24 hrs. ODAC (3Trimethoxysilyl) propyl] octadecyldimethylammonium chloride) dissolved in 7.8 g pure water and 10 g absolute ethanol and stirred until the solution clear (soln II). About 400 mg Pt@SOD dissolved in 10 ml 1:1 water ethanol solution and sonicated for 30 minutes and this solution and solution II were added to solution I. the entire solution is stirred at 333 K for 24 hrs after that autoclaved at 423 K for 36 hours. Filtered washed and calcined at 823 K for 6 hrs. The synthesized material was ion exchanged with ammonia solution for 4 hrs at 80° C. Wet impregnation method is used for making 18% Mo 4% NiO/Pt@SOD@ZSM Synthesis of Ni—Mo—Pt@SOD/$SiO_2$—$Al_2O_3$ The Pt@SOD was then impregnated using incipient wetness method over 18% MoO3, 4% NiO/$SiO_2$—$Al_2O_3$

Example 2

Jatropha oil was processed in a fixed bed reactor with sulfided Ni—Mo/Pt@SOD@ZSM-5. The reaction conditions for experiments were: 450° C., 80 bar, 1 $h^{-1}$, and 1000 liter $H_2$ gas/liter liquid feed. Simulated distillation of the products carried out according to the ASTM-2887-D86 procedure showed that the products had 47% of product in diesel range (>C15) and 33.0% in kerosene range (C9-15), and 19% lighter range (<C9) product.

Example 3

Jatropha oil was processed in a fixed bed reactor with sulfided Ni—Mo/Pt@SOD@ZSM-5. The reaction conditions for experiments were: 450° C., 80 bar, 1 h$^{-1}$, and 1500 liter H$_2$ gas/liter liquid feed. Simulated distillation of the products carried out according to the ASTM-2887-D86 procedure showed that the products had 37% of product in diesel range (>C15) and 34.0% in kerosene range (C9-15), and 28% lighter range (<C9) product.

Example 4

Jatropha oil was processed in a fixed bed reactor with sulfided Ni—Mo/Pt@SOD@ZSM-5. The reaction conditions for experiments were: 400° C., 80 bar, 1 h$^{-1}$, and 2000 liter H$_2$ gas/liter liquid feed. Simulated distillation of the products carried out according to the ASTM-2887-D86 procedure showed that the products had 31% of product in diesel range (>C15) and 47.0% in kerosene range (C9-15), and 22% lighter range (<C9) product. Greater than 99% conversion was achieved till 350+ hrs of operation.

Example 5

Jatropha oil was processed in a fixed bed reactor with sulfided Ni—Mo—Pt@SOD/SiO$_2$—Al$_2$O$_3$. The reaction conditions for experiments were: 380° C., 80 bar, 1 h$^{-1}$, and 1000 liter H$_2$ gas/liter liquid feed. Simulated distillation of the products carried out according to the ASTM-2887-D86 procedure showed that the products had 50% of product in diesel range (>C15) and 30.0% in kerosene range (C9-15), and 20% lighter range (<C9) product, isomer/normal hydrocarbon ratio being 1.5. ASTM D6730 DHAX analysis and GCXGC-FID showed around 8% mono aromatics, 2% polyaromatics and 9% napthenes in the overall product. The hydrogen generated due to formation of monoaromatics was 54.5 moles/day/kg of catalyst, due to polyaromatics was 40.6 moles/day/kg of cat and due to napthenes was 11.6 moles/day/kg of catalyst. Material balance results indicated consumption of hydrogen as 300 liters H$_2$/kg of catalyst.

Comparative Example 1

Jatropha oil was processed in a fixed bed reactor with sulfided Ni—Mo/SiO$_2$—Al$_2$O$_3$. The reaction conditions for hydrotreating experiments were: 450° C., 80 bar, 1.01 h$^{-1}$, and 3500 ml H$_2$ gas/ml liquid feed. The products were analyzed by gas-chromatography. The liquid feed was sent to the reactor through the pre-heater heated at 370° C. Simulated distillation of the products carried out according to the ASTM-2887-D86 procedure showed 38.1% middle range product (C9-C15) with isomer/normal hydrocarbon ratio 1.8 and complete conversion. ASTM D6730 DHAX analysis showed around 12% aromatics in the kerosene range. Material balance results indicated consumption of hydrogen as 363 liters H$_2$/kg of catalyst.

Comparative Example 2

Jatropha oil was processed in a fixed bed reactor with sulfided Ni—Mo/ZSM-5. The reaction conditions for hydrotreating experiments were: 400° C., 80 bar, 1 h$^{-1}$, and 1800 ml H$_2$ gas/ml liquid feed. The products were analyzed by gas-chromatography Analysis of products was carried out according to the ASTM D6730 DHAX procedure showed 36.5% middle range product (C9-C15) with isomer/normal hydrocarbon ratio 1.6 and complete conversion. ASTM D6730 DHAX analysis showed around 3.67% aromatics and greater than 99% conversion could be achieved only until 48 hrs of operation.

TABLE 1

Yield of various hydrocarbons

| Experiment | Temp (° C.) | P (bar) | WHSV (h$^{-1}$) | H$_2$/HC | <C9, wt % | C9-C15, wt % | >C15, wt % | i/n (C9-C15) | Decarboxylation/ Decarbonylatiom | H2 consumption, lit/hr of H$_2$/kg of catalyst | Days for .99.9% conversion, hrs |
|---|---|---|---|---|---|---|---|---|---|---|---|
| Comp. Ex. 1 | 450 | 80 | 1.01 | 3500 | 18.9 | 38.1 | 42.4 | 1.77 | | 363 | |
| Comp. Ex. 2 | 400 | 80 | 1 | 1800 | 23.14 | 36.5 | 40.35 | 1.6 | | | 48 |
| Ex. 1 | 450 | 80 | 1.0 | 1000 | 19 | 33 | 48 | 0.9 | 0.55 | | 350+ |
| Ex. 2 | 450 | 80 | 1.0 | 1500 | 28 | 37 | 34 | 1.2 | 0.50 | | 350+ |
| Ex. 4 | 400 | 80 | 1.0 | 2000 | 22 | 47 | 31 | 1.3 | 0.55 | | 350+ |
| Ex. 5 | 380 | 80 | 1 | 1000 | 20 | 30 | 50 | 1.5 | | 300 | |

Advantages of the Invention

The present invention relates to a low hydrogen catalytic process for the manufacture of the n-paraffins, iso-paraffins, cyclic and aromatics for gasoline and/or aviation turbine fuel and/or diesel range hydrocarbons (C1-C24 range) from renewable source such as oils originating from plant algae and animal fats and from conventional non-renewable crude based feed stocks such as diesel, naphtha, kerosene, gas oil, residue, etc., into gasoline, aviation, diesel, fuel and other hydrocarbons fuel with reduced coke formation and hydrogen generation due to formation of napthenes and aromatics.

To carry out the reaction in low H$_2$ atmosphere, an innovative methodology for the synthesis of multifunctional catalyst consisting of Pt/Pd encapsulated in sodalite cage as core with ZSM-5 synthesised around it as shell supported with nickel, molybdenum, cobalt, tungsten or one or more there off and/or Pt/Pd encapsulated in sodalite cage as core impregnated along with nickel, molybdenum, cobalt, tungsten or one or more there off over SiO$_2$—Al$_2$O$_3$, zeolite, Al$_2$O$_3$ as shell for hydroprocessing of renewables and non-renewable crude based feed stocks. Pt/Pd was encapsulated inside SOD cage, and sulfided catalyst was impregnated on the catalyst support. To overcome the difficulty of hydrogen transfer from platinum/palladium to the bulky feed molecules, base metals like nickel and molybdenum metals on the catalyst surface was impregnated. The hydrogenation activity of the impregnated metals has been achieved through sulfidation with dimethyl disulfide.

The overall hydrogenation activity has improved through the spillover of the hydrogen from Pt/Pd. Due to the high percentage of d character platinum/palladium can dissociate the hydrogen molecules faster than nickel and molybdenum. This hydrogen atom can have easily transferred from platinum/palladium to nickel/molybdenum/cobalt/tungston and to the reactant molecules. Even though the sulfur compounds are poisons to platinum/palladium metals, the presence of sodalite cages were protecting the metal clusters due to the size difference of the pores and sulfiding agents. Acidity of the catalyst is very important to the formation of isocompounds during the hydroprocessing of vegetable oils like jatropha, karanj, camalina, etc., and conventional non-renewable crude based feed stocks such as diesel, naphtha, kerosene, gas oil, residue etc into gasoline, aviation, diesel, fuel and other hydrocarbons fuel.

We claim:

1. A multifunctional catalyst comprising at least one noble metal further defined as platinum or palladium or both incorporated in a sodalite cage and mesoporous ZSM-5 or mesoporous $SiO_2$—$Al_2O_3$ or a combination thereof as a shell, wherein the shell is impregnated with at least one sulfidated base metal.

2. The multifunctional catalyst as claimed in claim 1, wherein the shell comprises mesoporous ZSM-5.

3. The multifunctional catalyst as claimed in claim 1, wherein the base metal is selected from the group consisting of nickel, molybdenum, cobalt, tungsten or mixture thereof.

4. A process for preparation of a multifunctional catalyst of claim 1 comprising:
   a) preparing a solution of $NaAlO_2$ and NaOH in demineralized water;
   b) mixing the solution of step a) with fumed $SiO_2$ to obtain a gel;
   c) preparing a solution of $[Pt(NH_3)_4]NO_3$ or $[Pd(NH_3)_4]NO_3$ or both in water;
   d) charging drop wise the solution obtained step c) to the gel obtained in step b) to obtain a gel mixture;
   e) transferring the gel mixture of step d) to a sealed contained and homogenized by vigorous stirring to obtain a gel;
   f) the gel obtained in step e) is stirred at 353-393K;
   g) filtering and washing with water until filtrate is neutral to obtain catalyst;
   h) reducing the catalyst at 573-873K in hydrogen atmosphere to obtain a sodalite cage comprising platinum or palladium or both;
   i) preparing a solution of $NaAlO_2$ in distilled water to obtain a solution;
   j) mixing the solution obtained in step i) with TBAOH and stirring for 2-4 hours;
   k) keeping the solution static for 24 hours to obtain a solution;
   l) preparing a solution of ODAC in water absolute ethanol mixture to get a clear solution;
   m) preparing a solution of catalyst obtained in step h) in water:ethanol mixture and sonicating to obtain a clear solution;
   n) mixing the solutions of step l) and solution of step m) to the solution of step k);
   o) stirring the entire solution at a temperature of 303-363K for 24-30 hours and autoclaving the mixture at 400-453K for 36 hours;
   p) filtering and washing to get the catalyst and calcined at 623-923K to get the new material;
   q) ion exchanging the material synthesized in step p) with ammonia solution for at 60-90° C. to obtain ion exchanged material;
   r) using a wet impregnation method to impregnate the at least one base metal on the ion exchanged material of step q),
   s) sulfidating the at least one base metal of the impregnated material of step r) to obtain the catalyst of claim 1.

5. The process as claimed in claim 4, wherein the base metal is selected from the group consisting of nickel, molybdenum, cobalt, tungsten or mixture thereof.

6. A process for the preparation of hydrocarbon fuel from feed stock using a catalyst as claimed in claim 1 comprising the steps of:
   a) suspending the sulfidated base metal containing multifunctional catalyst of claim 1 in a fixed bed reactor;
   b) maintaining the reactor at 300-480° C. and 50-150 bar pressure;
   c) charging the feed stock and $H_2$ gas; and
   e) simultaneous distillation of product to obtain different fractions.

7. The process as claimed in claim 6, wherein the base metal is selected from the group consisting of nickel, molybdenum, cobalt, tungsten or mixture thereof.

8. The catalyst as claimed in claim 1, wherein the noble metal is one of platinum or palladium.

9. The process as claimed in claim 6, wherein the feedstock is selected from vegetable oil, free fatty acids, microbial lipids, bio crude, nonrenewable crude.

10. The process as claimed in claim 6, wherein the noble metal is palladium or platinum.

* * * * *